United States Patent
Haubrich et al.

(10) Patent No.: US 8,499,872 B2
(45) Date of Patent: Aug. 6, 2013

(54) STEERING DEVICE FOR A SELF-PROPELLED CONSTRUCTION OR UTILITY MACHINE AND CONSTRUCTION AND UTILITY MACHINE HAVING SUCH A STEERING DEVICE

(75) Inventors: Thomas Haubrich, Goedenroth (DE); Thomas Klein, Wehr (DE)

(73) Assignee: BOMAG GmbH, Boppard (DE)

( * ) Notice: Subject to any disclaimer, the term of this patent is extended or adjusted under 35 U.S.C. 154(b) by 212 days.

(21) Appl. No.: 13/216,355

(22) Filed: Aug. 24, 2011

(65) Prior Publication Data

US 2012/0048639 A1    Mar. 1, 2012

(30) Foreign Application Priority Data

Aug. 24, 2010  (DE) .......................... 10 2010 035 270

(51) Int. Cl.
*B62D 33/063*    (2006.01)
(52) U.S. Cl.
USPC ....................................... 180/89.13
(58) Field of Classification Search
USPC .......................................... 180/89.13, 89.18
See application file for complete search history.

(56) References Cited

U.S. PATENT DOCUMENTS

| | | | | |
|---|---|---|---|---|
| 3,182,605 | A | * | 5/1965 | Brasher .......................... 105/342 |
| 5,618,146 | A | * | 4/1997 | Cooper .......................... 414/24.5 |
| 7,204,546 | B2 | * | 4/2007 | Antonetti ................. 296/190.04 |
| 7,540,685 | B2 | * | 6/2009 | Avikainen et al. .............. 404/83 |

FOREIGN PATENT DOCUMENTS

| | | |
|---|---|---|
| DE | 198 13 474 A1 | 10/1999 |
| DE | 199 41 883 A1 | 3/2001 |
| EP | 1 253 061 A2 | 10/2002 |
| WO | 90/15747 A1 | 12/1990 |

OTHER PUBLICATIONS

German Patent Office, English Abstract of German Patent No. DE 198 13 474 A1, published Oct. 7, 1999 (1 page).
German Patent and Trademark Office, Search Report, Application No. 10 2010 035 270.5, mailed Jun. 9, 2011 (5 pages).

* cited by examiner

*Primary Examiner* — Kevin Hurley
(74) *Attorney, Agent, or Firm* — Wood, Herron & Evans, LLP

(57) ABSTRACT

The present invention relates to a steering device for a self-propelled construction or utility machine. The construction or utility machine includes a cab having a carriage, which is adjustable transversely to the travel direction, on which operating and/or actuating elements and at least one steering wheel for steering the construction or utility machine are situated. The steering wheel is coupled via a steering drive shaft, which is mounted on the adjustable carriage, and is carried along upon adjustment, to a steering output shaft, which is situated fixed in place on the construction or utility machine and runs transversely to the steering drive shaft. The steering movements applied to the steering wheel are transmitted by means of a direction change gearing, which is also mounted on the carriage, from the steering drive shaft to the transversely running steering output shaft, the direction change gearing also being carried along upon adjustment of the carriage and being situated so it is axially displaceable to the steering output shaft.

11 Claims, 6 Drawing Sheets

STEERING DEVICE FOR A SELF-PROPELLED CONSTRUCTION OR UTILITY MACHINE AND CONSTRUCTION AND UTILITY MACHINE HAVING SUCH A STEERING DEVICE

CROSS-REFERENCE TO RELATED APPLICATIONS

The present application claims priority under 35 U.S.C. §119 of German Patent Application No. 10 2010 035 270.5, filed Aug. 24, 2010, the disclosure of which is hereby incorporated herein by reference in its entirety.

FIELD OF THE INVENTION

The present invention relates to a steering device for a self-propelled construction or utility machine, in particular a ground compaction machine or a ground milling machine, which has a cab having a carriage, which is adjustable transversely to the travel direction, having a driver's seat and operating and actuating elements including a steering wheel.

Using the carriage, the seat can be situated in a position between the left and right sides of the cab together with the operating and actuating elements as required by the situation, in order to allow the best possible view for the driver. The cab is equipped with a carriage displaceable transversely to the travel direction, on which a driver's seat and operating and actuating elements are situated.

BACKGROUND OF THE INVENTION

Such a steering device is known from DE 19813474 A1. The vehicle wheels are activated via a hydraulic steering system, the steering wheel rotation being detected via a hydraulic steering valve on the carriage, which is connected via flexible hydraulic lines to the fixed part of the steering system. In order that the hydraulic lines can be carried along upon displacement of the carriage, they must be situated in a loop, for which relatively complex, covered line guides must be provided in order to protect them against damage. The lines are subject to undesired mechanical strain during a movement of the carriage. In addition, the line guiding restricts the free surface area available in the cab for the driver.

SUMMARY OF THE INVENTION

The present invention is therefore based on the object of specifying a steering device of the type mentioned above and a construction or utility machine having such a steering device, in which the line guiding of the hydraulic steering system is simplified.

This object is achieved in that the steering wheel is coupled via a steering drive shaft, which is mounted on the adjustable carriage and is carried along upon adjustment, to a steering output shaft, which is situated fixed in place on the construction or utility machine and runs transversely to the steering drive shaft, and the steering movements applied to the steering wheel are transmitted by means of a direction change gearing, which is also mounted on the carriage, from the steering drive shaft to the transversely running steering output shaft, the direction change gearing also being carried along upon adjustment of the carriage and being situated so it is axially displaceable to the steering output shaft for this purpose.

According to one aspect of the present invention, the steering wheel is coupled via a steering drive shaft (steering column), which is mounted on the movable carriage and is carried along during displacement, to a steering output shaft, which is situated fixed in place on the construction or utility machine and runs transversely to the steering drive shaft, such that the steering movements applied to the steering wheel are transmitted by means of a direction change gearing, which is also mounted on the carriage, from the steering drive shaft to the transversely running steering output shaft (and vice versa), the direction change gearing being carried along like the steering drive shaft upon adjustment of the carriage and being situated or mounted so it is axially displaceable to the steering output shaft for this purpose. The steering drive shaft and the steering output shaft are preferably oriented perpendicularly to one another.

A shaft is understood as a rod-shaped machine element for relaying rotational movements and torques. A direction change gearing is understood as a mechanical gearing in which the axis of the input rotational movement and the axis of the output rotational movement are skewed to one another.

In the steering device according to one embodiment of the present invention, steering movements can be mechanically transmitted from the steering wheel situated on the carriage to the construction or utility machine, on the other hand, the adjustability of the carriage relative to the chassis of the construction machine being unrestrictedly ensured. The steering device therefore allows a linear displacement of the carriage. A substantial advantage of the steering device according to the present invention may be seen in that hydraulic connection lines are not necessary and the disadvantages mentioned above therefore no longer exist. Since hydraulic lines therefore no longer have to be carried along upon adjustment of the carriage, the adjustment or displacement forces, which are typically to be applied manually, are also comparatively low. A further advantage may be seen in that the construction or utility machine can be steered even during the adjustment of the carriage or during the adjustment procedure.

It is provided in one embodiment that the direction change gearing is a spiral wheel gearing, one pinion being situated axially aligned on the end of the steering drive shaft facing away from the steering wheel and the driven wheel being held or mounted so it is rotationally fixed but axially displaceable on the steering output shaft. Such a spiral wheel gearing is explained in greater detail hereafter in connection with the figures. Alternatively, a suitable angular gearing can also be provided. In particular, it is provided that the steering drive shaft is connected so it can be disengaged to the pinion of the spiral wheel gearing. This is advantageous for maintenance measures, for example.

In order to be able to situate the direction change gearing so it is axially displaceable to the steering output shaft, and in particular to be able to mount the driven wheel so it is rotationally fixed but axially displaceable on the steering output shaft, the steering output shaft can be at least sectionally implemented as a spline shaft or as a polygonal shaft. A shaft in which the form fit to a hub (shaft-hub connection) is produced by a plurality of tooth-like formfitting elements is referred to as a spline shaft. With a polygonal shaft, the form fit to a hub is produced by a nonround shape. The hub of the driven wheel is to be implemented accordingly in each case. In particular, the shaft-hub connection between steering output shaft and driven wheel can be disengaged, which is advantageous with respect to maintenance measures.

In order to allow low-friction operation of the steering device, it is provided that the steering output shaft is mounted on roller bearings. It is provided in one embodiment that the steering output shaft is fastened by means of two roller bearings, in particular ball bearings, on the chassis of the construction or utility machine. The roller bearings are preferably located on the axial ends of the steering output shaft.

A preferred refinement of the steering device according to one aspect of the present invention provides that the steering output shaft is directly coupled to a hydraulic steering valve or is directly flanged thereon. Alternatively, it can be provided that the steering output shaft is indirectly coupled to a hydraulic steering valve, which can be implemented in particular by a chain drive or the like. An adaptation to existing space conditions can be performed in this way.

It is provided in one embodiment that the adjustable carriage is a linear displaceable steering, seat, and operating unit. In this way, the steering wheel advantageously maintains its ergonomically selected position to the driver's seat and the operating and/or actuating elements. In particular, it is provided that the direction change gearing is integrated in a seat carrier of this steering, seat, and operating unit.

BRIEF DESCRIPTION OF THE DRAWINGS

The present invention is described in greater detail hereafter on the basis of two exemplary embodiments shown in the drawings. In the schematic figures.

DETAILED DESCRIPTION

Figure 1:
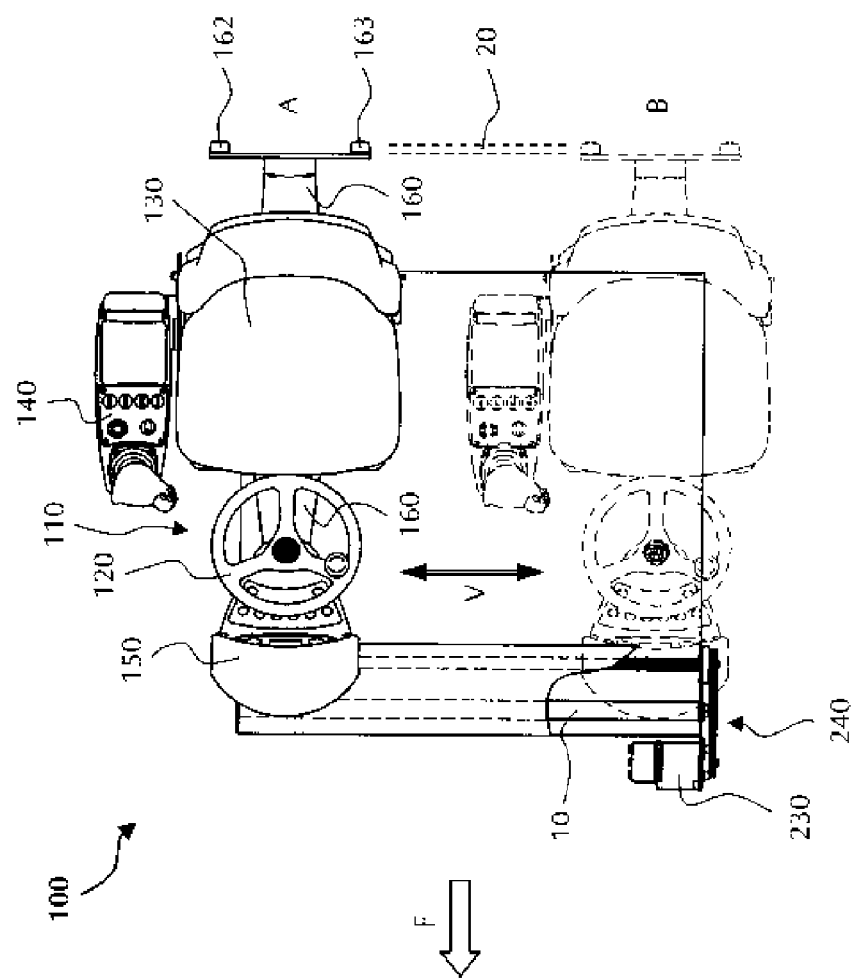
FIG. 1 shows a cab of a construction or utility machine in a top view.

FIG. 1 shows a cab 100 of a construction or utility machine (not shown in greater detail). The 100 has a carriage 110, which is displaceable or adjustable transversely to the travel direction F, and on which a steering wheel 120 for steering the construction or utility machine, a driver's seat 130, an operating console 140, and a dashboard 150 are situated. The carriage 110 can therefore be referred to as an adjustable steering, seat, and operating unit. The carriage 110 has a seat carrier (or central traverse) 160, which is linearly guided on the chassis of the construction or utility machine on its front end and rear end in each case with respect to the travel direction F on a transversely running rail (or spar) 10 and 20, respectively. Running rollers are identified by 162 and 163.

The carriage 110 having the operating and actuating elements situated thereon and the seat 130 can be adjusted or displaced transversely to the travel direction F between the right travel side of the construction or utility machine (position A) and the left travel side (position B (shown by dashed lines)) and locked in any desired position. The adjustability is indicated by a double arrow V. In order to ensure the adjustability of the carriage 110 and also be able to implement the transmission of steering movements, the steering device 200 explained hereafter is provided.

Figure 2:
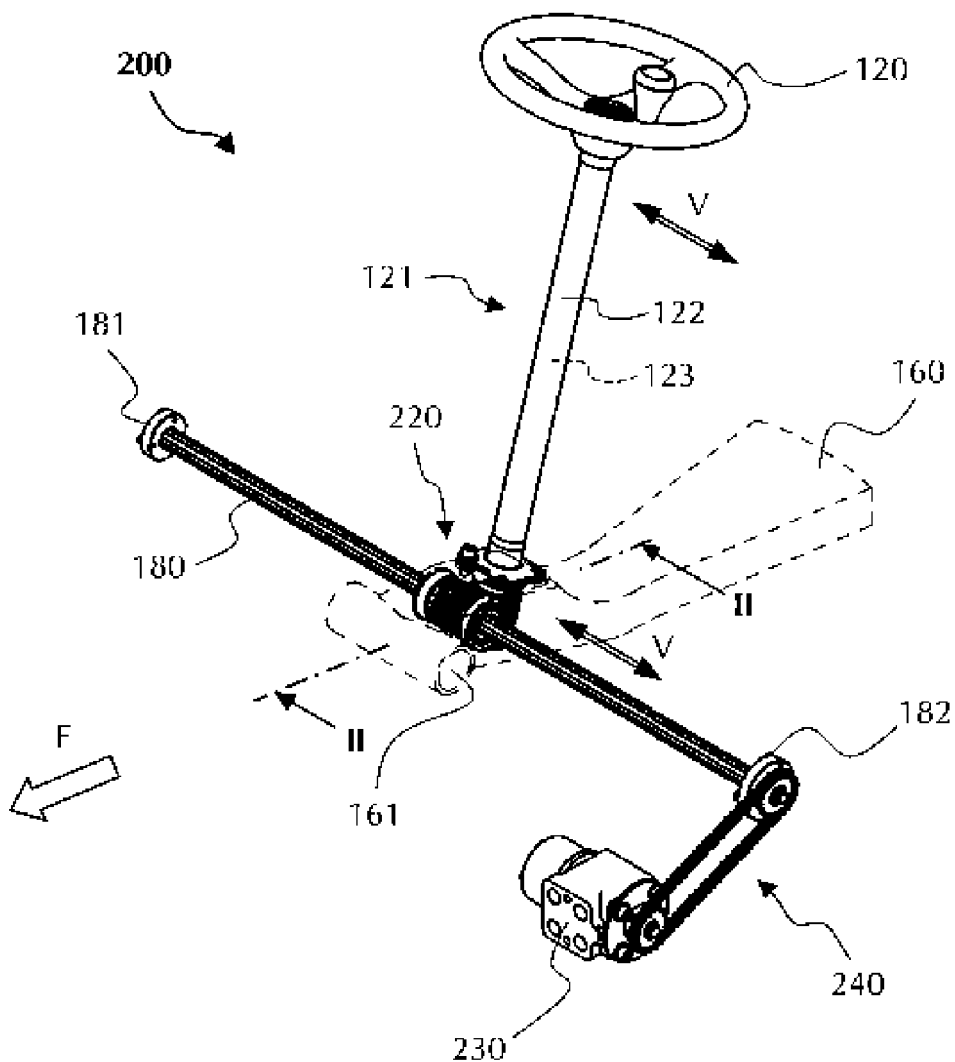
FIG. 2 shows a first exemplary embodiment of a steering device in a perspective view.

FIG. 2 shows a first exemplary embodiment of a steering device 200. The steering movements applied at the steering wheel 120 are transmitted via a steering column 121 to a transversely-running steering output shaft 180. The orientation of the steering output shaft 180 corresponds to the adjustment direction V of the carriage 110 or the seat carrier 160. The steering rod 121 comprises a steering drive shaft 123, which extends through a sleeve 122 (see FIG. 5). The linear steering column 121 is oriented perpendicularly to the steering output shaft 180. An inclined orientation is also possible, for example, through use of universal joints on the steering drive shaft 123. The steering output rod 180, which is oriented horizontally and transversely to the travel direction F, is fastened fixed in place on the chassis of the construction or utility machine and mounted by means of ball bearings 181 and 182. The coupling between the steering drive shaft 123 and the steering output shaft 180 is performed by means of a direction change gearing 220, as explained in greater detail hereafter.

The steering movements (see curved arrows in FIG. 3), which are applied to the steering wheel 120 and transmitted via the steering output shaft 123 and the direction change gearing 220 to the steering output shaft 180, are transmitted at one axial end of the steering output shaft 180 via a chain drive 240 to a fixed hydraulic steering valve 230, whereby a steering procedure is initiated. Instead of a chain, a toothed belt or similar element can otherwise also be provided as the transmission element. Originating from the steering valve 230, rotational movements can be transmitted back to the steering wheel 120, whereby the steering wheel 120 can be restored into a neutral position, for example.

The steering wheel 120 is rigidly connected by means of the steering column 121 to the seat carrier 160 of the carriage 110 or fastened on this seat carrier 160. The steering wheel 120 fastened on the seat carrier 160 is thus automatically moved or guided along upon the adjustment of the carriage 110, which is indicated in FIG. 2 by the double arrows V. Furthermore, the direction change gearing 220 is rigidly connected to the seat carrier 160 or integrated in the seat carrier 160, on the one hand (see FIG. 5), and mounted so it is axially displaceable to the steering output shaft 180 and is thus also moved along upon adjustment of the carriage 110, on the other hand, as explained in greater detail hereafter in connection with FIGS. 3 and 4. A slide bushing on the front end of the seat carrier 160 is identified by 161, which is mounted so it is axially displaceable on the front rail or the front spar 10 (see FIG. 1).

Figure 3:
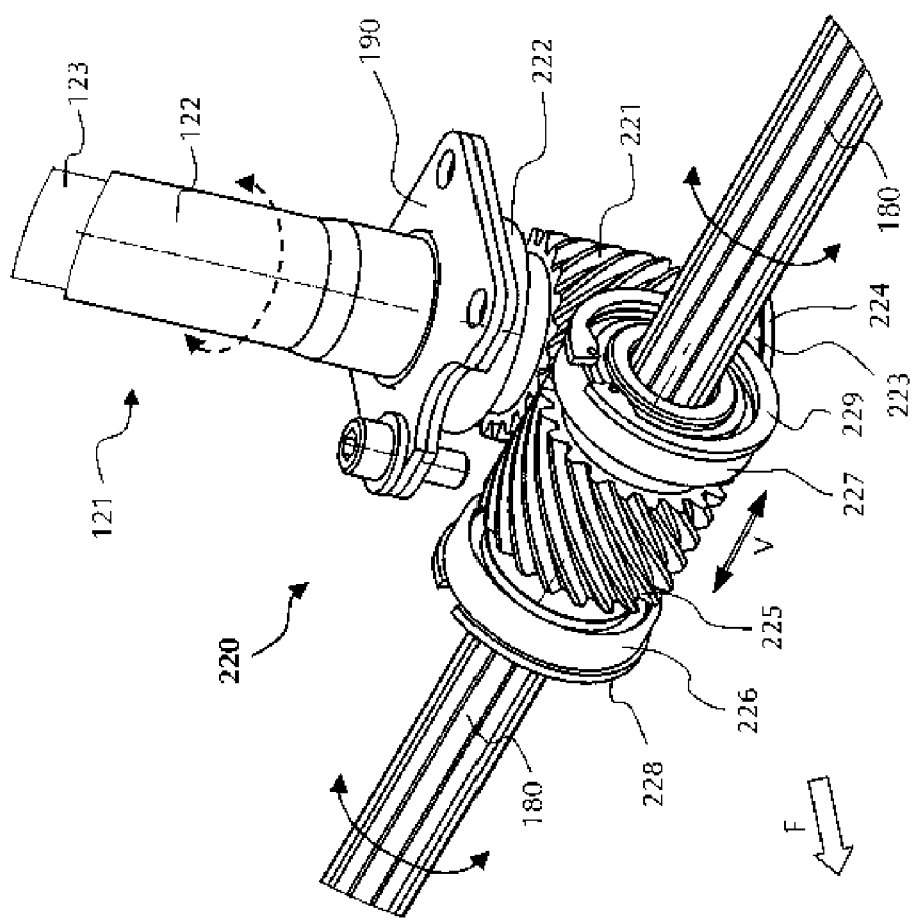
FIG. 3 shows a direction change gearing, which is used in the steering device of FIG. 2, in a perspective view.
Figure 4:
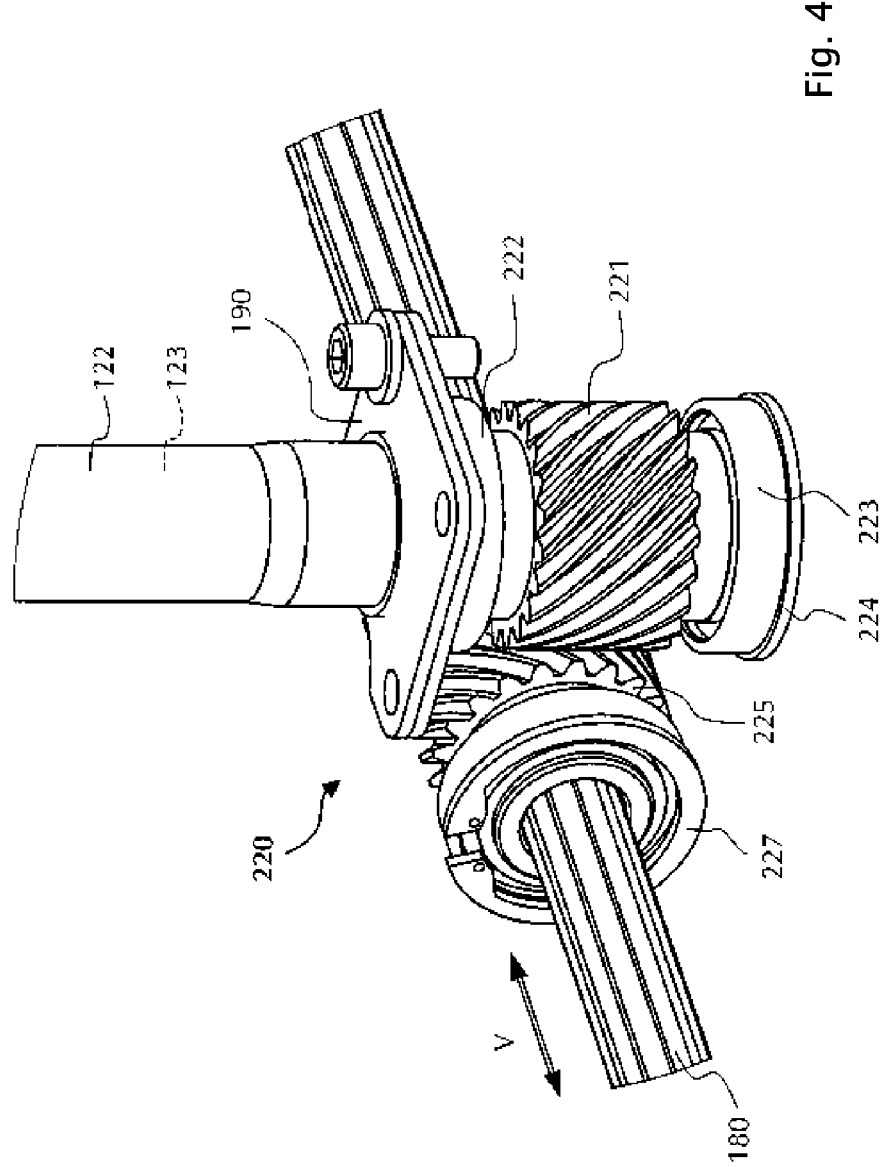
FIG. 4 shows the direction change gearing of FIG. 3 in another perspective view.

FIG. 3 and FIG. 4 show the same direction change gearing 220 in various views, the perspective of FIG. 3 corresponding to that of FIG. 2 and FIG. 4 showing the rear side. The direction change gearing 220 is a spiral wheel gearing having a pinion or pinion shaft 221, which is connected rigidly and axially aligned with the steering drive shaft 123, and a spiral-toothed driven wheel 225. The pinion 221 and the driven wheel 225 are engaged with one another in the way shown. The pinion 225 drives the driven wheel 225 (and vice versa), the rotational axes being offset by 90°. The rotational movements of the steering drive shaft 123 and the steering output shaft 180 are indicated by curved arrows.

The steering output shaft 180 is implemented as a spline shaft (alternatively as a polygonal shaft), the hub of the driven wheel 225 being implemented having an internal profile corresponding to the spline shaft profile. In this way, both the transmission of torques between the driven wheel 225 and the steering output shaft or spline shaft 180 and also the axial displaceability of the driven wheel 225 (or the entire spiral wheel gearing 220) on the steering output shaft or spline shaft 180 are implemented.

Upon adjustment or displacement of the carriage 110, the driven wheel 225 (or the entire spiral wheel gearing 220) is axially displaced on the steering output shaft 180 via the seat carrier 160. During the adjustment or displacement of the carriage 110, the steering wheel 120 is advantageously not set into rotation. A further advantage of the steering system 200 according to the invention may be seen in that the same steering transmission ratio is always provided independently of the respective position of the carriage 110.

Furthermore, FIGS. 3 and 4 show a fastening flange 190 for fastening the steering column 121 or the sleeve 122 on the seat carrier 160. Roller bearings, in particular ball bearings, are identified by 222, 223, 226, and 227, which allow a rotational decoupling of the pinion 221 and the driven wheel 225 in relation to the seat carrier 160, which is partially obvious from FIG. 5, explained hereafter. Locking discs for fastening in the seat carrier 160 are identified by 224, 228, and 229.

Figure 5:
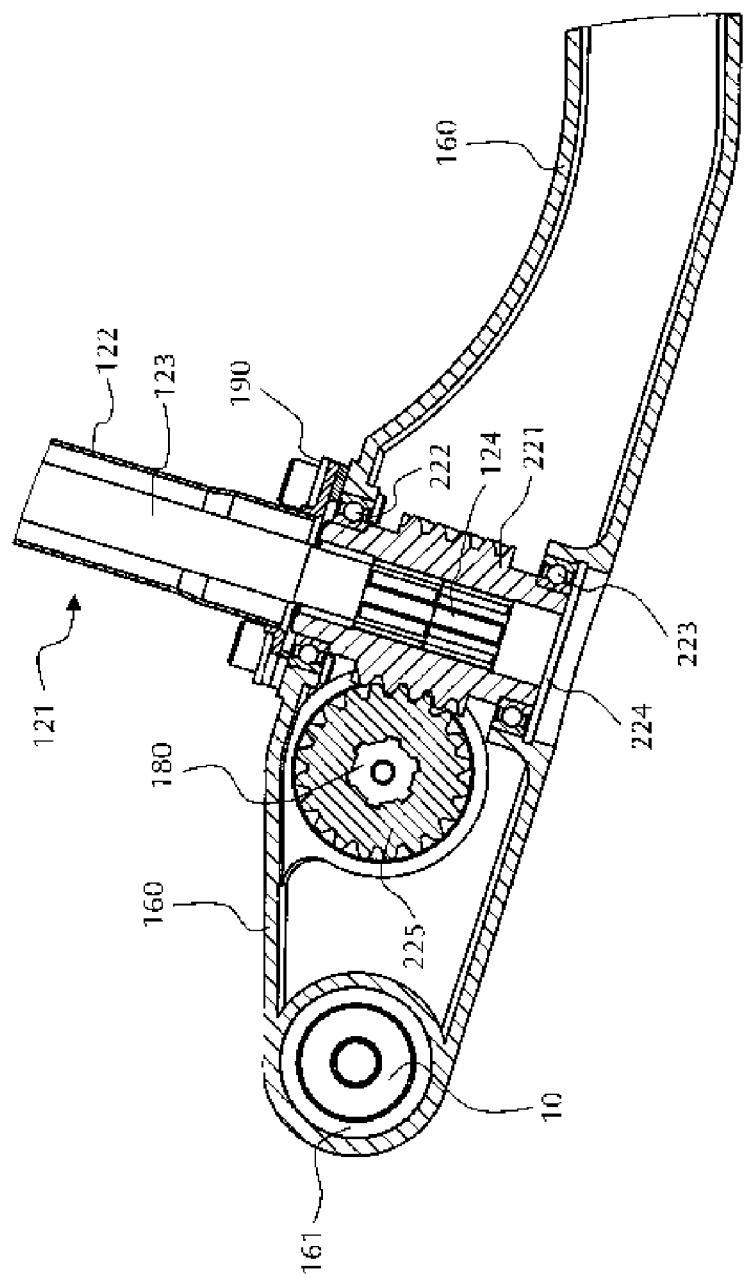
FIG. 5 shows a section through the front area of the seat carrier according to the section line indicated in FIG. 2.

FIG. 5 shows a sectional view of the front area of the seat carrier 160 associated with the carriage 110 according to the section line II-II indicated in FIG. 2. The illustration shows the structural integration of the direction change gearing or spiral wheel gearing 220 in the seat carrier 160. The pinion 221 is mounted by means of an upper ball bearing 222 and a lower ball bearing 223 in the seat carrier 160 and is held by the locking disc 224. The steering drive shaft 123 is also indirectly mounted on roller bearings by means of the ball bearings 222 and 223. The driven wheel 225 is also mounted and held similarly in the seat carrier 160 (see FIGS. 3 and 4). The pinion 221 and the driven wheel 225 of the spiral wheel gearing 220 are also fixed and oriented to one another by the fastening in the seat carrier 160.

The pinion 221 is connected aligned with the lower end of the steering drive shaft 123. The connection is performed via spline teeth 124. The sleeve 122 enclosing the steering drive shaft 123 is screwed onto the seat carrier 160 by means of the flange 190. The driven wheel 225 is mounted on the steering output shaft 180, as explained above. On the front end, the seat carrier 160 is mounted by means of the slide bush 161 on the front spar 10 (see FIG. 1), load forces acting on the seat carrier 160 predominantly being dissipated via this mounting.

Upon adjustment or displacement of the carriage 110, the seat carrier 160 having the direction change gearing 220 integrated therein is moved relative to the fixed rail 10 and relative to the fixed steering output shaft 180, the steering wheel 120 being moved or guided along via the rigid connection by means of the steering column 121. In each position of the carriage 110, the steering movements applied to the steering wheel 120 can be mechanically transmitted via the steering drive shaft 123 and the direction change gearing 220 to the fixed steering output shaft 180.

Figure 6:
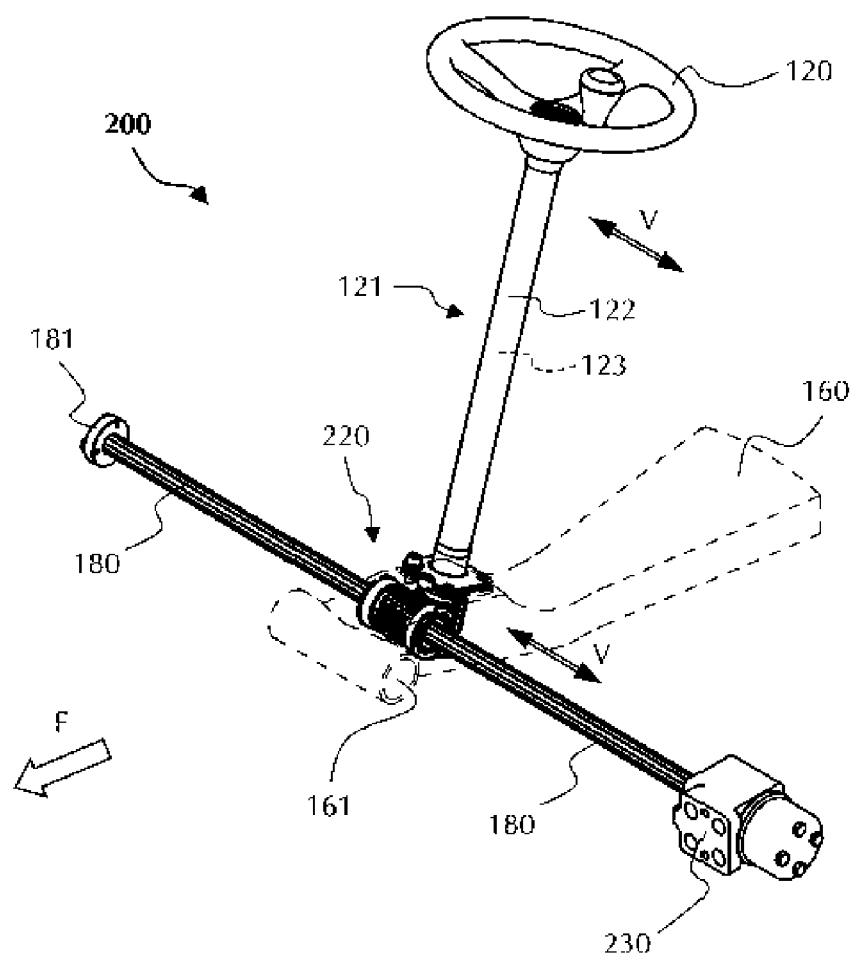
FIG. 6 shows a second exemplary embodiment of a steering device in a perspective view.

FIG. 6 shows a second exemplary embodiment of a steering device 200. Instead of the chain drive 240 shown in FIG. 2, the steering output shaft 180 is connected directly to the hydraulic steering valve 230. Instead of such a direct connection, a connection by means of a gearing can also be provided.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of Applicants' invention.

What is claimed is:

1. A steering device for a self-propelled construction or utility machine having a cab including a carriage, which is adjustable transversely to a travel direction, on which operating and/or actuating elements, and at least one steering wheel for steering the construction or utility machine are situated,
wherein the at least one steering wheel is coupled via a steering drive shaft, which is mounted on the adjustable carriage and is carried along upon adjustment, to a steering output shaft, which is situated fixed in place on the construction or utility machine and runs transversely to the steering drive shaft, and wherein steering movements applied to the steering wheel are transmitted by means of a direction change gearing, which is also mounted on the carriage, from the steering drive shaft to the transversely running steering output shaft, the direction change gearing also being carried along upon adjustment of the carriage and being situated so it is axially displaceable to the steering output shaft.

2. The steering device according to claim 1,
wherein the direction change gearing is a spiral wheel gearing, a pinion being situated axially aligned on the end of the steering drive shaft facing away from the steering wheel, and a driven wheel being mounted so it is rotationally fixed but axially displaceable on the steering output shaft.

3. The steering device according to claim 2,
wherein the steering drive shaft is connected to the pinion of the spiral wheel gearing so it can be disengaged.

4. The steering device according to claim 1,
wherein the steering output shaft is implemented as a spline shaft or polygonal shaft.

5. The steering device according to claim 1,
wherein the steering output shaft is mounted on roller bearings.

6. The steering device according to claim 1,
wherein the steering output shaft is directly coupled to a hydraulic steering valve.

7. The steering device according to claim 1,
wherein the steering output shaft is indirectly coupled to a hydraulic steering valve.

8. The steering device according to claim 1,
wherein the adjustable carriage is a linearly displaceable steering, seat, and operating unit.

9. The steering device according to claim 8,
wherein the direction change gearing is integrated in the seat carrier of the steering, seat, and operating unit.

10. A construction or utility machine, having a cab including a carriage, which is displaceable transversely to a travel direction, on which operating and/or actuating elements and at least one steering wheel for steering the construction or utility machine are situated, comprising:
a steering device according to claim 1.

11. The steering device according to claim 7,
wherein the steering output shaft is indirectly coupled to the hydraulic steering valve via a chain drive.

* * * * *